Jan. 7, 1969    D. L. PLETCHER ET AL    3,420,499

VALVE

Filed Feb. 28, 1966

INVENTOR.
DONALD L. PLETCHER
JOHN D. STALTER
BY

ATTORNEYS

United States Patent Office 3,420,499
Patented Jan. 7, 1969

3,420,499
VALVE
Donald L. Pletcher, Bristol, and John D. Stalter, Elkhart, Ind., assignors to Nibco, Inc., Elkhart, Ind., a corporation of Indiana
Filed Feb. 28, 1966, Ser. No. 530,609
U.S. Cl. 251—266                  9 Claims
Int. Cl. F16k 3/28

ABSTRACT OF THE DISCLOSURE

A valve having a rotational, threaded, axially fixed valve stem extending through a bonnet, with a valve plunger threadably engaged on the stem to move into and out of the valve seat region; the plunger having a polymeric jacket crimped onto a threaded core and symmetrically curved to match special, protruding, annular or ring shaped arcuate valve seats spaced by recesses around the inlet and outlet passages, each seat defining a limited area contact surface concave over its narrow width to match the plunger jacket, so that the resilient jacket protrudes into the recesses and passages and seals on the ring shaped seats.

---

This invention relates to a fluid valve, and more particularly to a fluid valve having a unique plunger and valve seat relationship.

This invention is an improvement on that construction shown in U.S. Patent No. 3,217,735, assigned to the assignee herein.

The type of valve construction in the above identified patent has many advantages as set forth in detail in that patent. However, the valve in that patent does exhibit one characteristic which is considered by the assignee herein to be a disadvantage. More specifically, its useful life is relatively short, particularly in high pressure systems, because of the loss of complete sealing after a number of cycles. Upon discovering this fact, the inventors herein experimented with the valve extensively to determine the reason for loss of the absolute seal after a certain useful length of time. It was found that the rubber coat tends to absorb liquids from the pipeline system, and swell out of proper shape, and also tends to roll or deform progressively into a non-sealing configuration. Both of these factors contribute to the loss of complete sealing of the configurated rubber plunger coating against the likewise configurated valve seat surface between the valve passages.

After determining this, the inventors herein decided to modify the structure to try to eliminate this. Firstly, different materials were employed for the coating. It was concluded that a nondeforming, nonabsorbing, nonswelling, polymeric material having excellent wear and lubricious characteristics should be employed as a configurated jacket on the plunger, particularly Teflon (polytetrafluoroethylene). However, Teflon does not ordinarily bond to metal and this raised an immediate problem. Further, it was found that when a special structure was devised so that Teflon could be applied as a jacket, it was so rigid in character due to its small resilient compressibility, i.e., "give," that tremendous rotational force had to be applied to the valve handle and stem in order to get the configurated Teflon jacket to completely seal against likewise configurated valve seat surface.

The inventors herein therefore developed a special valve assembly enabling a hard rigid nonswelling, nonabsorbing material such as Teflon to be employed on the plunger for a long useful life, and to also be able to obtain a complete seal between the configurated Teflon jacket on the plunger and the cooperative valve seat region in the valve body.

The chief object of this invention therefore is to provide a valve construction having a plunger with nonabsorbing, nonswelling, nondeforming characteristics, particularly a Teflon jacket, to obtain an extended useful life of the valve, but one which is also capable of forming a complete seal between the plunger and the valve seat region of the valve body with only normal closing force rather than excessive force being required, with this proper sealing action being obtainable between the Teflon and the metal seat because of a special interfitting relationship between these two components. Particularly, the construction causes a pair of special ring type, limited, controlled engagements between the Teflon jacket and the valve body, with a special recess between the rings.

Another object of this invention is to provide a novel valve construction enabling a relatively rigid, nonabsorbing, nonswelling, configurated jacket material such as Teflon having only slight resilient compressibility to be used and also to be capable of a complete seal, because of a special configuration of the valve seat region of the valve body.

Another object of this invention is to provide a novel valve assembly enabling a Teflon plunger jacket to be employed on the plunger because of a unique attachment of the jacket to the plunger core.

These and other objects of this invention will become apparent upon studying the following specification in conjunction with the drawings in which.

Figure 1:
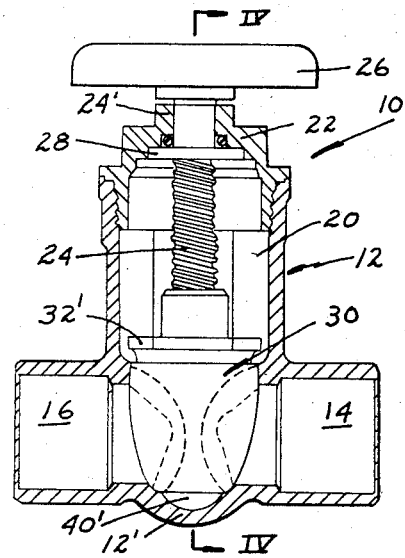
FIG. 1 is a side elevational sectional view of the novel valve assembly, taken through the center of the valve body, and showing the valve in its closed position.

Referring now specifically to the drawings, the complete valve assembly 10 there shown includes a valve body 12 which defines a through flow passageway including an inlet passage 14, an outlet passage 16 and a valve seat region 18 therebetween. The valve body 12 also forms an elongated chamber 20 generally on one side of the valve seat region and intersecting the valve seat region. Closing off the open end of chamber 20 is a bonnet 22 which is threadably connected to internal threads in hollow chamber 20. It has an elongated opening extending therethrough to receive the upper cylindrical end 24' of a threaded stem 24. The end 24' of the stem extends out of the bonnet and has a handle 26 mounted thereon. On the underside of bonnet 22 is a disc 28 fitted around the stem. This disc 28 and handle 26 hold stem 24 in one particular axial position when the stem and handle are rotated. Axial movement of valve plunger assembly 30 on this threaded stem is by reason of a threaded connection between the stem 24 and the internal threads of hollow core member 32 of the plunger.

This plunger assembly 30 is basically composed of this hollow core 32 and a special configurated jacket 34. The core includes a peripheral flange 32' at one end of the elongated jacket, and has its other end extending through the jacket to a position almost flush with the nose end 34' of jacket body 34. Flange 32' interfits with chamber 20 in a manner to prevent the plunger from rotating when it is axially shifted with respect to stem 24. This is done by having both the flange and the chamber inner wall of noncircular corresponding configuration, such as the polygonal configuration shown for both flange 32' and the inner wall of chamber 20.

The configurated body or jacket 34 of the plunger is formed of a material having lubricious, nonabsorbing, nonswelling, relatively hard and rigid, and good wear characteristics, but having a small amount of resilient compressibility. It preferably is Teflon, i.e., polytetrafluoroethylene. It is symmetrical in configuration, having a circular cross section at all portions thereof, but having a central opening extending its entire length to be fitted on elongated core 32 with the base larger diameter end flush with flange 32', and a slight recess 34" in the opposite end inside nose 34'.

Since, according to present technology, Teflon will not bond properly to metal surfaces, the jacket or body 34 is especially attached to the core by deforming the core. Specifically, the end 32" of the core is deformed, preferably by being spun, radially outwardly into the recess 34" against the jacket to bind it tightly against flange 32' of the core. Also, the outer lower edge of flange 32' is crimped down around the outer upper peripheral edge of jacket at 32a. The annular nose of the jacket protrudes axially and has a slight curvature. The jacket 34 varies in diameter from its large diameter upper end adjacent flange 32' to its smallest diameter lower end, with the change in diameter being generally on a taper from one end to the other, but also with a slight convex curvature, particularly on the nose region. It generally has the configuration of a truncated cone, therefore. If desired, the curvature along the length of the jacket may be increased so that the overall configuration departs from a generally truncated cone structure and approaches a spherical structure, provided that the engagement rings around the passages are correspondingly curved so that the rings always trace a path on the plunger jacket periphery.

Figure 4:
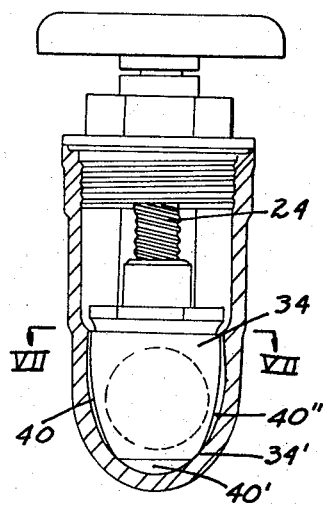
FIG. 4 is a sectional view of the complete assembly, taken on plane IV—IV of FIG. 1.

As shown in FIG. 4 of the prior Patent 3,217,735 noted above, the valve seat surface of the prior construction was formed with a configuration to exactly match the configuration of the rubber coat on the valve. However, it has been found that when Teflon is used for the outer surface, it has such a small amount of resilient compressibility that sealing can only be obtained between such like configurated surfaces if tremendous force is applied to the handle and stem. The inventors herein devised a particular type of novel interfitting relationship between the plunger jacket and the valve seat region, so that a proper seal could be obtained with only normal force, and with the Teflon not being worn significantly over an extended useful life.

Figure 2:
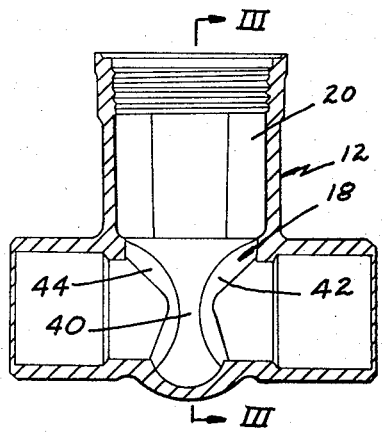
FIG. 2 is a side elevational sectional view of only the valve body in the assembly of FIG. 1.
Figure 3:
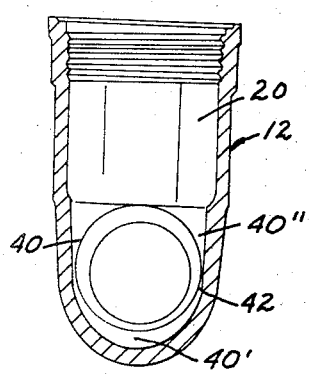
FIG. 3 is a sectional view of the valve body taken on plane III—III of FIG. 2.
Figure 5:
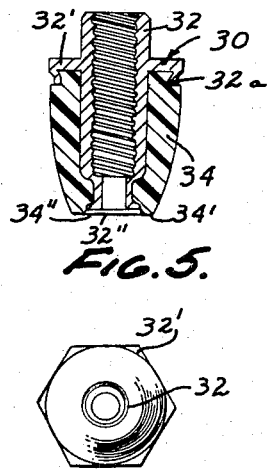
FIG. 5 is a sectional view of the valve plunger taken on a vertical plane through the center of the plunger.
Figure 6:
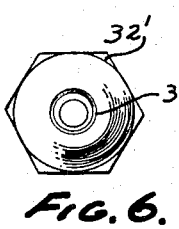
FIG. 6 is a top plan view of the plunger in FIG. 5.
Figure 7:
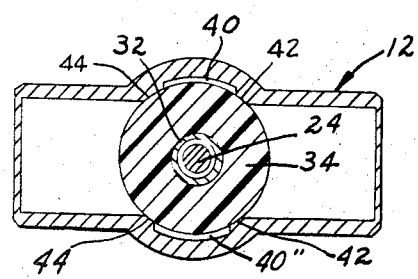
FIG. 7 is a sectional view taken on plane VII—VII of FIG. 4.

More specifically, it was found that if the sealing engagement between the plunger periphery and the valve seat region is limited to specific small controlled areas, with special recess means between these areas, the Teflon will seal readily and completely against the metal seat, with bulging or protruding of the Teflon slightly into the recesses. Referring specifically to FIGS. 2 and 3 and 7, it will be noted that elongated recess means 40, 40', 40" in the valve seat region extends on one lateral side of the valve seat region from passage 20 (40) down across the base or bottom of the valve seat region (40') and up on the opposite side of the valve seat region (40") to form a continuous recess extending in a path generally of a U. In this valve seat region adjacent the inner ends of the outlet passage and inlet passage are therefore formed a pair of limited area contact sealing ring surfaces 42 and 44 of concavely curved width (FIG. 7). Each ring surface extends in three dimensions, having an arcuate curvature from the recess on one lateral side to the recess on the other. The surfaces therefore form arcuately curved rings, each forming a trace path on the surface of a tapered element having the configuration of the jacket, so that these rings match the peripheral corresponding surface regions of jackets 34 exactly. They may be formed by a tool having a configuration exactly like the perihery of jacket 34.

The portion of the valve body which forms the bottom end 40' of the recess is actually a slight protrusion 12' which extends exactly opposite the portion forming chamber 20. This concavity enables the annular nose 34' of plunger jacket 34 to complete the seal against the lower portions of rings 42 and 44 as shown in FIG. 1, since the polymeric material can protrude slightly into this concavity 40' also, as well as protruding slightly into side recesses 40 and 40". The actual protrusion is only measurable in ten thosuandths of an inch and therefore cannot be seen from the drawings. It actually is a very real factor however, and is believed to be essential for proper sealing with this type of jacket material. This action is obtained, as explained, by the limited engagement area, i.e., specifically the limited engagement between the annular rings and the plunger jacket, in combination with the recess areas.

The resulting unique valve construction has been found to provide an extended useful life, giving excellent sealing action repeatedly over a long period. Additional advantages to those specifically noted herein may occur to those in the art upon studying the foregoing description and drawings. It is also conceivable that certain minor deviations in construction may be made within the concept presented. Hence, the invention is intended to be limited only by the scope of the appended claims and the reasonably equivalent structures to those defined therein.

We claim:

1. In a valve assembly having (1) a valve body with a through flow passageway including an inlet passage and an outlet passage and a valve seat region therebetween, said body also forming a chamber located generally on one side of said valve seat region and intersecting said valve seat region; (2) a bonnet on said body at said chamber with a stem carried thereby and extending into said chamber; and (3) a valve plunger threadably connected to said stem and movable axially and nonrotationally from said chamber into said valve seat region for closing the flow passageway; the improvement comprising: said valve plunger having a core and an outer, lubricious, resilient, polymeric, nonabsorbing, and nonswelling jacket of relatively low, resilient compressibility attached to said core; and said jacket and said valve seat region being configurated to cause engagement between said jacket and said valve seat region at said inlet and outlet passage regions to be in the form of curved rings, with recess means between said rings, to allow slight protrusion of said jacket material into said recess means while limiting the area of engagement between said jacket and said valve body to said rings said jacket having an inner passage receiving said core, said core being hollow and internally threaded into one end thereof for attachment to said stem, said core having a radially extending flange adjacent said one end, said flange being crimped around a peripheral portion of said jacket, and the end of said core opposite said stem being deformed radially outwardly to bind said jacket to said core.

2. The valve assembly in claim 1 wherein: said recess means is formed by said valve body having a U-shaped recess in said valve seat region, and said curved rings are formed astraddle said U shaped recess and around said inlet and outlet passages.

3. The valve assembly in claim 2 wherein: said recess includes a concavity in said valve seat region directly opposite said chamber; and said jacket includes an annular nose on its end opposite said stem to engage the portions of said rings adjacent said concavity and to protrude slightly into said concavity.

4. The valve assembly in claim 1 wherein said jacket is polytetrafluoroethylene.

5. In a valve assembly having (1) a valve body with a through flow passageway including an inlet passage and an outlet passage and a valve seat region therebetween, said body also forming a chamber located generally on one side of said valve seat region and intersecting said valve seat region; (2) a bonnet on said body at said chamber with a stem carried thereby and extending into said chamber; and (3) a valve plunger threadably connected to said stem and movable axially and nonrotationally from said chamber into said valve seat region for closing the flow passageway; the improvement comprising: said valve plunger having a resilient, polymeric outer portion configured symmetrically, convergently away from said stem in a slightly convex curvature; and said valve seat region in said valve body having protruding, annular, ring-shaped sealing seats surrounding said inlet and outlet passages, each ring-shaped seat being arcuately concavely curved from one lateral side of said seat to the other, and each having a width causing a limited area contact surface therearound, and each configured to substantially match the configuration of said plunger outer portion.

6. The assembly in claim 5 wherein said sealing ring surfaces are each concavely curved across its width to match the convex curvature of said plunger outer portion.

7. The assembly in claim 5 wherein said plunger and valve seat regions are configured to form recess means between said ring-shaped seats to allow slight protrusion of said plunger outer portion into said recess means while limiting the area of engagement between said plunger outer portion and said valve body to said ring-shaped seats.

8. The assembly in claim 7 wherein said plunger outer portion includes a jacket of a lubricious, nonabsorbing, nonswelling material of relatively low, resilient compressability.

9. The assembly in claim 8 wherein said jacket is polytetrafluoroethylene.

References Cited

UNITED STATES PATENTS

| | | | |
|---|---|---|---|
| 2,401,112 | 5/1946 | Saunders | 251—257 X |
| 2,653,791 | 9/1953 | Mueller | 251—317 X |
| 2,868,499 | 1/1959 | Kaminsky | 251—368 X |
| 2,893,687 | 7/1959 | Huthsing | 251—368 X |
| 2,914,258 | 11/1959 | Ruetsch | 251—368 X |
| 2,983,477 | 5/1961 | Merrill | 251—327 X |
| 3,217,735 | 11/1965 | Stalter | 251—266 |

WILLIAM F. O'DEA, *Primary Examiner.*

D. R. MATTHEWS, *Assistant Examiner.*

U.S. Cl. X.R.

251—191, 214, 309, 316, 327, 368; 137—329.02